United States Patent
Park

(10) Patent No.: US 9,862,310 B2
(45) Date of Patent: Jan. 9, 2018

(54) APPARATUS AND METHOD FOR CONTROLLING VEHICLE LAMP

(71) Applicant: HYUNDAI MOTOR COMPANY, Seoul (KR)

(72) Inventor: Chong Bae Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 124 days.

(21) Appl. No.: 14/956,259

(22) Filed: Dec. 1, 2015

(65) Prior Publication Data

US 2017/0057404 A1 Mar. 2, 2017

(30) Foreign Application Priority Data

Aug. 27, 2015 (KR) .................. 10-2015-0121263

(51) Int. Cl.
- *H05B 37/02* (2006.01)
- *B60Q 1/34* (2006.01)
- *B60Q 1/00* (2006.01)

(52) U.S. Cl.
CPC ........... *B60Q 1/346* (2013.01); *B60Q 1/0023* (2013.01); *B60Q 1/343* (2013.01); *H05B 37/0227* (2013.01)

(58) Field of Classification Search
CPC .... H05B 37/02; H05B 37/0227; H05B 33/08; B60Q 1/346; B60Q 1/0023; B60Q 1/343; B60Q 1/40; B60R 1/088; B60R 1/025

USPC ............ 315/77–82, 291, 307, 308; 340/465, 340/475–477
See application file for complete search history.

(56) References Cited

U.S. PATENT DOCUMENTS

| | | | | |
|---|---|---|---|---|
| 6,975,218 B2* | 12/2005 | Madau | ..................... | B60Q 1/40 180/167 |
| 8,564,425 B2* | 10/2013 | Al-Jafar | ............... | B60Q 1/2665 180/167 |
| 2014/0218213 A1* | 8/2014 | Schneider | .............. | G08G 1/167 340/905 |

FOREIGN PATENT DOCUMENTS

| | | |
|---|---|---|
| JP | 2007-223382 A | 9/2007 |
| JP | 2009-149123 A | 7/2009 |
| JP | 2010-018184 A | 1/2010 |
| JP | 2010-254050 A | 11/2010 |
| KR | 10-1997-0015212 A | 9/1995 |
| KR | 10-2012-0062215 A | 6/2012 |
| KR | 10-2014-0045696 A | 4/2014 |
| KR | 20-2014-0004529 U | 7/2014 |

\* cited by examiner

*Primary Examiner* — Jimmy Vu
(74) *Attorney, Agent, or Firm* — McDermott Will & Emery LLP

(57) ABSTRACT

An apparatus for controlling a vehicle lamp includes a turn signal lamp, a turn signal lamp switch configured to operate the turn signal lamp, a lane change detector configured to detect lane change, and a controller configured to release the operation of the turn signal lamp when the lane change detector determines that the lane change has been completed after the operation of the turn signal lamp switch.

9 Claims, 6 Drawing Sheets

APPARATUS AND METHOD FOR CONTROLLING VEHICLE LAMP

CROSS-REFERENCE TO RELATED APPLICATION

This application is based on and claims the benefit of priority to Korean Patent Application No. 10-2015-0121263, filed on Aug. 27, 2015, in the Korean Intellectual Property Office, the disclosure of which is incorporated herein in its entirety by reference.

TECHNICAL FIELD

The present disclosure relates to an apparatus and method for controlling a vehicle lamp and, more particularly, to an apparatus and method for controlling a vehicle lamp when a vehicle changes a lane.

BACKGROUND

In general, vehicles include a headlamp for securing a front visual field when vehicles are driven at night, a turn signal lamp installed on a front side to indicate a left or right moving direction of a vehicle, and a rear combination lamp including a brake lamp, a tail light, and a turn signal lamp installed at the rear thereof.

Vehicles also have a display panel box, that is, a cluster user setting menu (USM), displaying measured values of a speedometer, a tachometer, oil holding, and a temperature for user notification.

In the related art, through the display panel box, a user may select the number of operations of a lamp of the vehicle, specifically, a turn signal lamp indicating a moving direction, when changing a lane.

FIG. 1 is a view illustrating a display panel box in the related art.

As illustrated in FIG. 1, a user interface allowing for selecting the number of operations of a turn signal lamp when changing a lane is provided on the display panel box.

The user may select the number of operations of the turn signal lamp as three times, five times, or seven times, or may stop (OFF) the operation of the turn signal lamp. When the user changes a lane, the turn signal lamp is operated according to a value selected through the display panel box or a value selected when the vehicle is released.

In such a case, however, when a lane is not changed within a predetermined period of time due to a traffic situation or inexperienced driving, the user may need to operate the turn signal lamp again.

Operating the turn signal lamp again may cause an accident while driving or may prevent the user from handling a driving situation accordingly, creating a situation not utilizing the advanced features of a vehicle.

SUMMARY

The present disclosure has been made to solve the above-mentioned problems occurring in the prior art while advantages achieved by the prior art are maintained intact.

An aspect of the present disclosure provides an apparatus and method for controlling a vehicle lamp, whereby an operation of a turn signal lamp is automatically controlled while a vehicle changes a lane.

An aspect of the present disclosure provides a user interface allowing a user to select a function of automatically controlling a turn signal lamp operation.

According to an exemplary embodiment of the present disclosure, an apparatus for controlling a vehicle lamp includes: a turn signal lamp; a turn signal lamp switch configured to operate the turn signal lamp; a lane change detector configured to detect a lane change; and a controller configured to release an operation of the turn signal lamp when the lane change detector determines that the lane change has been completed after the operation of the turn signal lamp switch.

The turn signal lamp may be operated until the lane change is completed after the turn signal lamp switch is operated.

When a vehicle has been completely moved to a lane to which the vehicle intended to move, the lane change detector may detect that the lane change has been completed.

The lane change detector may include a lane departure warning system (LDWS) or a lane keeping assist system (LKAS).

The lane change detector may include a blind spot detection (BSD).

When the BSD detects that another vehicle approaches a rear side of the vehicle (that is, when another vehicle approaches from behind the vehicle), the controller may delay the operation of the turn signal lamp for a predetermined period of time to be released.

The apparatus may further include: a display configured to provide a user interface allowing the user to select a function of automatically controlling the operation of the turn signal lamp.

According to another exemplary embodiment of the present disclosure, a method for controlling a vehicle lamp including a turn signal lamp includes: receiving a signal for operating the turn signal lamp to change a lane of a vehicle by a user; detecting a change in lane; and when it is detected that the lane change has been completed after a turn signal lamp switch was operated, releasing the operation of the turn signal lamp.

BRIEF DESCRIPTION OF THE DRAWINGS

The above and other objects, features and advantages of the present disclosure will be more apparent from the following detailed description taken in conjunction with the accompanying drawings.

FIG. 1 is a view illustrating a display panel box in the related art.

FIG. 2 is a block diagram of an apparatus for controlling a vehicle lamp according to an exemplary embodiment of the present disclosure.

FIG. 3 is a view illustrating an example of a turn signal lamp switch for operating a turn signal lamp when a driver changes a lane.

FIG. 4 is a block diagram of an apparatus for controlling a vehicle lamp according to another exemplary embodiment of the present disclosure.

FIG. 5 is a view illustrating a display according to another exemplary embodiment of the present disclosure.

FIG. 6 is a flow chart illustrating a method for controlling a vehicle lamp according to an exemplary embodiment of the present disclosure.

DETAILED DESCRIPTION

Hereinafter, exemplary embodiments of the present disclosure will be described in detail with reference to the accompanying drawings. In describing the exemplary embodiments of the present disclosure, when it is determined that a detailed description of known components or functions associated with the present disclosure unnecessarily obscures the gist of the present disclosure, the detailed description thereof will be omitted.

Also, elements of the exemplary embodiments of the present disclosure are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated exemplary embodiment and divided exemplary embodiment of the respective elements are included in the scope of the present disclosure unless it diverts from the essence of the present disclosure.

Also, some of the elements may be optional to merely enhance the performance, rather than being essential to perform a constitutional function. The present disclosure may be implemented by using only the elements requisite for implementing the essence of the present disclosure, excluding elements used to merely enhance the performance, and a structure including only the essential elements excluding the optional elements merely used to enhance the performance is also included in the scope of the present disclosure.

Figure 1:
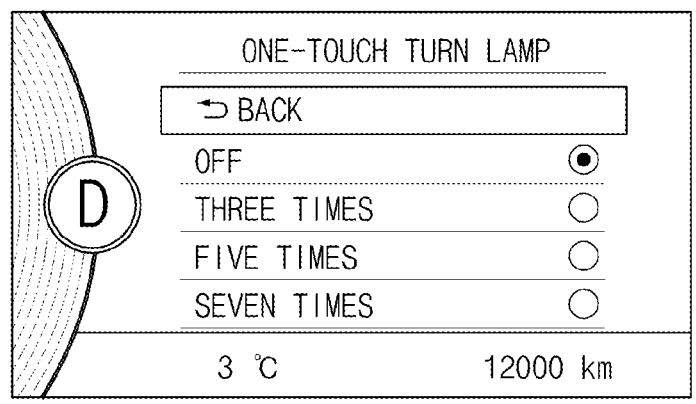
Figure 2:
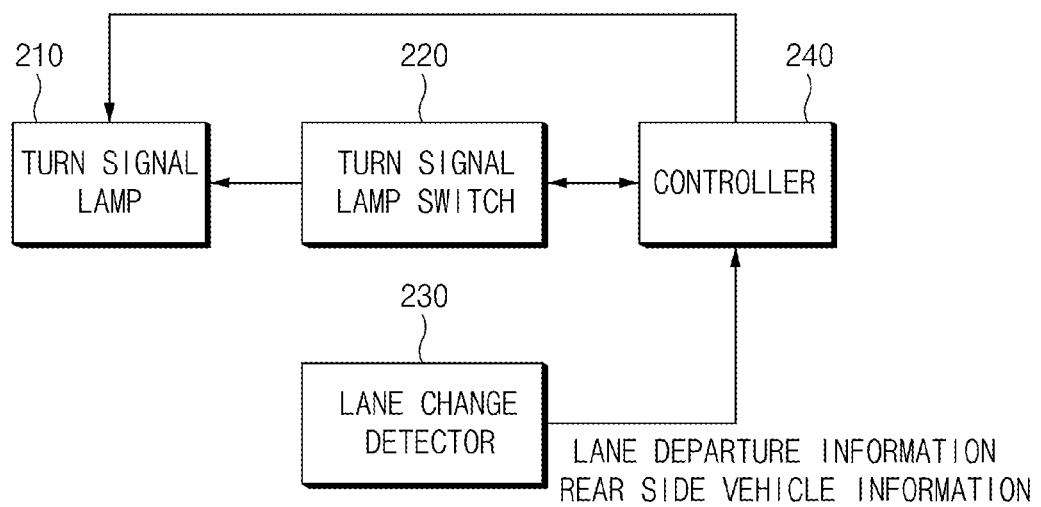

FIG. 2 is a block diagram of an apparatus for controlling a vehicle lamp according to an exemplary embodiment of the present disclosure.

As illustrated in FIG. 2, an apparatus for controlling a vehicle lamp according to the present exemplary embodiment may include a turn signal lamp 210, a turn signal lamp switch 220, a lane change detector 230, and a controller 240 controlling these elements. The apparatus for controlling a vehicle lamp may be implemented as a component included in a vehicle or as an independent module included in a vehicle, or may be implemented as an independent module detachably attached to a vehicle to set operation of the turn signal lamp 210 or inspect the turn signal lamp 210.

Figure 3:
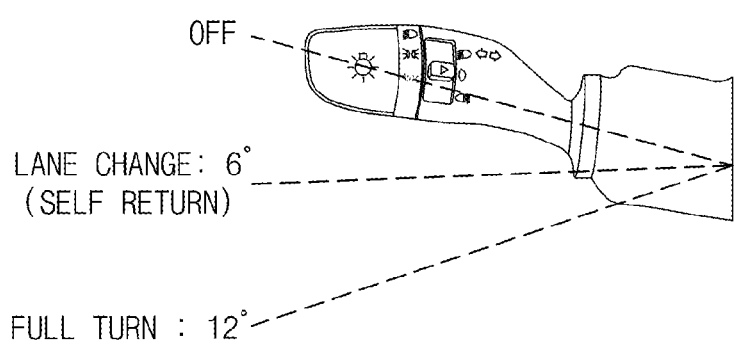

The turn signal lamp switch 220 is a component for a user to operate the turn signal lamp 210 when changing a lane. FIG. 3 is a view illustrating an example of the turn signal lamp switch 220.

As illustrated in FIG. 3, the turn signal lamp switch 220 in an OFF state may be sloped by about 6 degrees in changing a lane (self return) and sloped by about 12 degrees in case of full turn according to a user manipulation.

When the turn signal lamp switch 220 is operated at full turn, the turn signal lamp 210 blinks until the turn signal lamp switch 220 is returned to the OFF position.

Meanwhile, when the turn signal lamp switch 220 is positioned in the lane change, the turn signal lamp 210 may operate according to a preset number of times or a preset environment.

When the existing turn signal lamp switch 220 is positioned in the lane change, the turn signal lamp 210 blinks a preset number of times such as three times, five times, or seven times and the operation is soon released.

The lane change detector 230 detects a change in lane, and provides corresponding information to the controller 240.

Only when a vehicle has been completely moved to a lane to which it was intended to move, the lane change detector 230 may determine that lane change has been completed, and when the vehicle has not been completely moved to a lane, the lane change detector 230 may determine that lane change has not been completed even though a specific period of time has lapsed.

The lane change detector 230 may be implemented as a lane departure warning system (LDWS) or a lane keeping assist system (LKAS) and a camera may be included therein.

When the turn signal lamp switch 220 is operated by the user and it is detected by the lane change detector 230 that lane change has been completed, the controller 240 may release the operation of the turn signal lamp 210, and when it is detected by the lane change detector 230 that lane change has not been completed, the controller 240 may control the turn signal lamp 210 to maintain an operation thereof.

The controller 240 may be implemented as a smart junction box.

The turn signal lamp 210 may be operated by the controller 240 until lane change is completed, that is, until completion of lane change is detected, rather than for a specific determined time, after the turn signal lamp switch 220 is operated.

A driving situation is changed all the time according to driving ability of a driver, a road situation, and a situation of a nearby vehicle, and thus, according to an exemplary embodiment of the present disclosure, the turn signal lamp 210 is automatically operated until when a lane is changed.

In this manner, user inconvenience that the user should determine an operation time of the turn signal lamp 210 when changing a lane is eliminated, and marketability and convenience of a vehicle may be enhanced by using the LDWS or the LKAS installed in the vehicle.

Also, in the related art, in a case in which the number of times to operate the turn signal lamp is set to a fixed number, if the user fails to change a lane within the fixed period of time, the user should operate the turn signal lamp switch again, causing inconvenience. According to the present disclosure, such inconvenience may be resolved.

According to another exemplary embodiment of the present disclosure, the lane change detector 230 may further include a rear side warning system (i.e., a blind spot detection (BSD)) at a rear side of the vehicle.

Here, when it is detected by the BSD that a different vehicle approaches the rear side of the vehicle, the controller 240 may delay the operation of the turn signal lamp 210 for a predetermined period of time to be released.

This is to enhance safety with respect to a rear vehicle, lowering a possibility of an accident that may occur when the vehicle changes a lane.

The predetermined period of time may be set to two to three seconds or a predetermined period of time may be selected by the user through a user interface.

Figure 4:
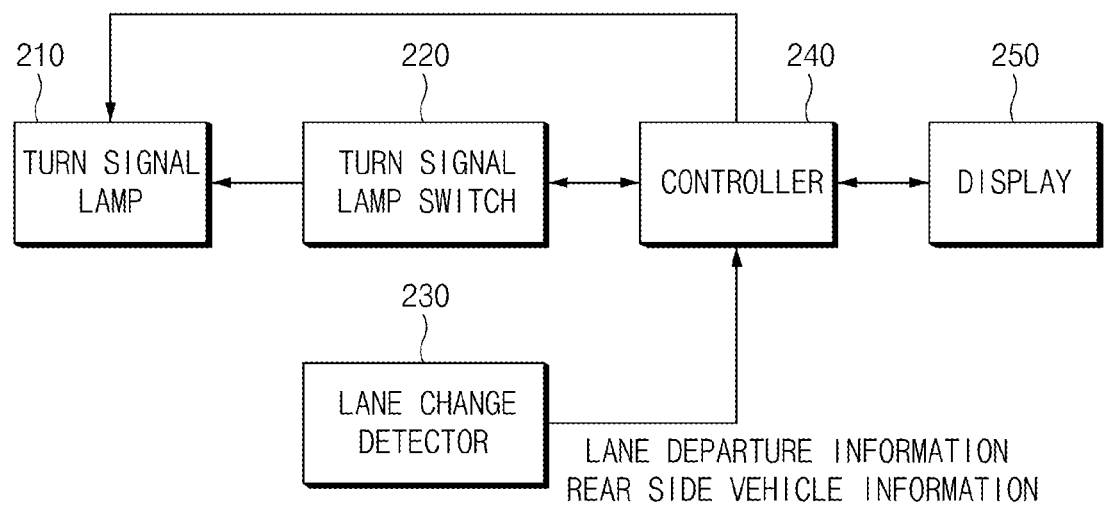

FIG. 4 is a block diagram of an apparatus for controlling a vehicle lamp according to another exemplary embodiment of the present disclosure.

As illustrated, the apparatus for controlling a vehicle lamp according to another exemplary embodiment of the present disclosure further includes a display 250 in addition to the elements illustrated in FIG. 2.

The display 250, a display panel box, may provide a user interface allowing the user to select a function for automatically controlling an operation of the turn signal lamp by displaying a cluster user setting menu.

The user may select any one of three times, five times, and seven times as a number of times of operating the turn signal lamp 210 when a lane is changed as in the related art, but the user may also select a function of automatically controlling an operation of the turn signal lamp 210 through the display 250.

Figure 5:
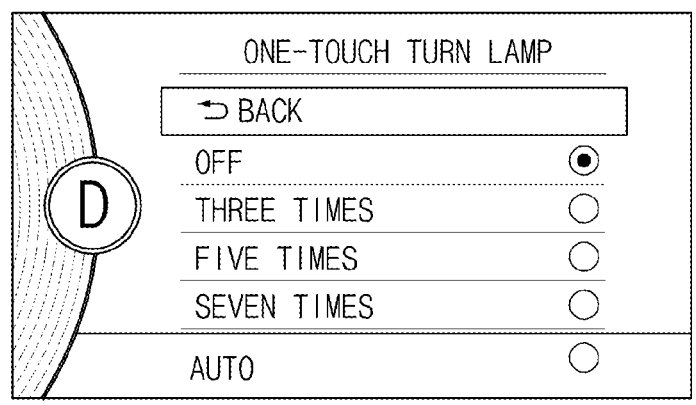

FIG. 5 is a view illustrating a display 250 according to another exemplary embodiment of the present disclosure, in which an example of the display 250 is illustrated.

As illustrated in FIG. 5, in the display 250, an item "Auto" is illustrated in the lowest portion of the figure. When changing a lane, the user may maintain an operation of the turn signal lamp 210 until a lane change operates and a lane is completely changed, by selecting the item "Auto".

Since the user interface is provided through the display 250, utilization of the lane change detector such as the LDWS or the LKAS, a high-end option, in the vehicle may be increased. Also, fidelity (loyalty) to the vehicle may be increased by enhancing an experience for the user to directly select a function without additionally increasing manufacturing cost, compared with an existing vehicle.

Figure 6:
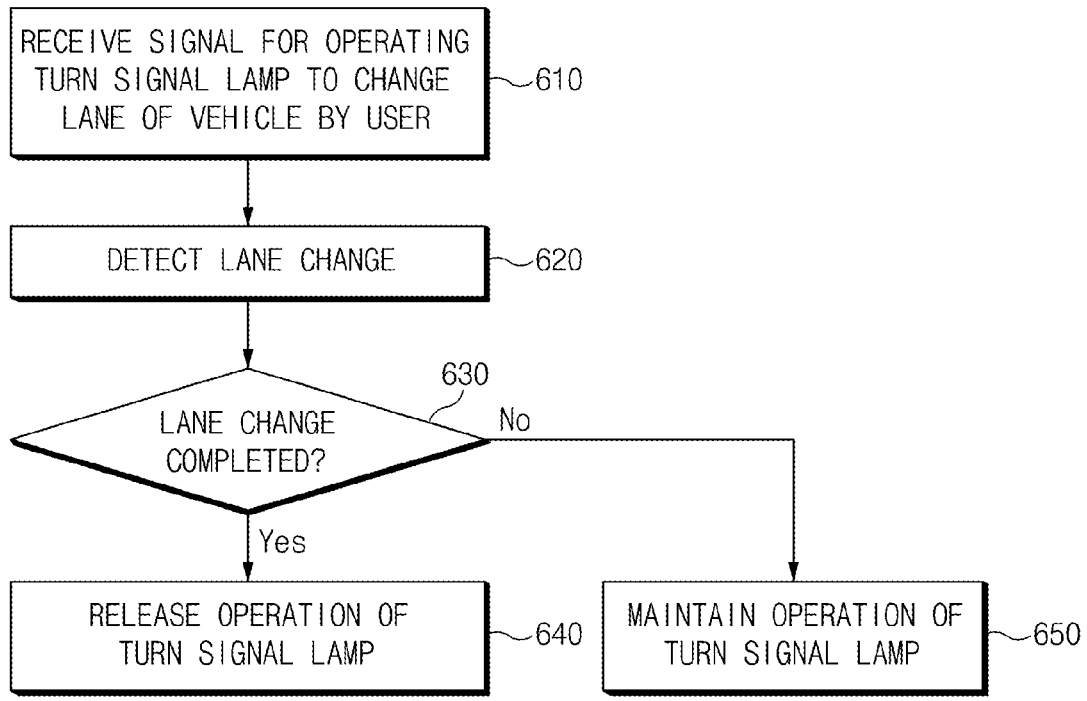

FIG. 6 is a flow chart illustrating a method for controlling a vehicle lamp according to an exemplary embodiment of the present disclosure. The method for controlling a vehicle lamp including a turn signal map according to an exemplary embodiment of the present disclosure will be described with reference to FIG. 6.

First, a signal for operating a turn signal lamp is received to change a lane of a vehicle by a user (610).

The user performs a mechanical operation to change a lane, and the vehicle changes a lane in a direction intended by the user.

A turn signal lamp is changed from OFF to a lane change, and blinks according to the user manipulation.

Lane change is detected by the lane change detector included in the vehicle (620). The lane change may be detected by at least one of the LDWS, the LKAS, and the BSD.

When it is detected by the lane change detector that lane change has been completed (630), the controller releases the operation of the turn signal lamp (640).

Also, according to an exemplary embodiment of the present disclosure, in a case in which the BSD is included in the vehicle and it is detected that another vehicle approaches the rear side of the vehicle through the BSD, the controller may delay the operation of the turn signal lamp for a predetermined period of time to be released. The predetermined period of time may be set to two to three seconds.

This is to enhance safety with respect to the rear vehicle by preventing collision to the rear vehicle that may occur when the vehicle changes a lane and clearly informing the rear vehicle that the vehicle will change the lane.

Meanwhile, when it is detected by the lane change detector that lane change has not been completed after the turn signal lamp switch is operated, that is, when lane change has not been completed yet due to the user's inexperienced driving or operation or when a situation in which the user has difficulty in changing a lane due to a traffic condition, or the like, is maintained, the controller controls the turn signal lamp to maintain the operation thereof (650).

It should be appreciated that software including instructions and algorithm may be imbedded in the controller to execute the aforementioned operations.

According to another exemplary embodiment, the method may further include providing a user interface allowing the user to select a function of automatically controlling an operation of the turn signal lamp. The user interface may be provided before a lane is changed, and thus, the user interface may be provided automatically or manually to the user before the vehicle drives.

Also, the function of automatically controlling an operation of the turn signal lamp through the display may be set as a default value when the vehicle is released, and may be deleted or changed by the user afterwards.

As described above, according to the exemplary embodiments of the present disclosure, the apparatus and method for controlling a vehicle lamp, whereby an operation of the turn signal lamp is automatically controlled while a lane of a vehicle is changed, are provided.

Also, as described above, according to exemplary embodiments of the present disclosure, the user interface allowing the user to select the function of automatically controlling the turn signal operation is provided.

In the above exemplary embodiments described above, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

The exemplary embodiments of the present disclosure have been described with reference to the accompanying drawings, and it will be apparent to those skilled in the art that various modifications and variations can be made in the present disclosure without departing from the scope of the disclosure. Thus, the technical idea of the present disclosure should be interpreted to embrace all such alterations, modifications, and variations in addition to the accompanying drawings.

What is claimed is:

1. An apparatus for controlling a vehicle lamp comprising:
a turn signal lamp;
a turn signal lamp switch configured to operate the turn signal lamp;
a lane change detector configured to detect lane change and including a blind spot detection (BSD); and
a controller configured to release the operation of the turn signal lamp when the lane change detector determines that the lane change has been completed after the operation of the turn signal lamp switch, wherein, when the BSD detects that another vehicle approaches a rear side of the vehicle, the controller is configured to delay the operation of the turn signal lamp for a predetermined period of time to be released.

2. The apparatus according to claim 1, wherein after the turn signal lamp switch is operated, the turn signal lamp is operated until the lane change detector determines that the lane change is completed.

3. The apparatus according to claim 1, wherein when a vehicle has been completely moved to a lane to which the vehicle was intended to move, the lane change detector detects that the lane change has been completed.

4. The apparatus according to claim 1, wherein the lane change detector further includes a lane departure warning system (LDWS) or a lane keeping assist system (LKAS).

5. The apparatus according to claim 1, further comprising:
a display configured to provide a user interface allowing a user to select a function of automatically controlling an operation of the turn signal lamp.

6. A method for controlling a vehicle lamp including a turn signal lamp, the method comprising:

receiving a signal for operating the turn signal lamp to change a lane of a vehicle by a user;

detecting a change in lane using a blind spot detection (BSD); and releasing the operation of the turn signal lamp when the lane change has been completed after a turn signal lamp switch was operated, wherein, when the BSD detects that another vehicle approaches the rear side of the vehicle, the operation of the turn signal lamp is delayed for a predetermined period of time to be released.

7. The method according to claim 6, further comprising detecting the lane change by at least one of a lane departure warning system (LDWS) and a lane keeping assist system (LKAS).

8. The method according to claim 6, further comprising:
providing a user interface allowing the user to select a function of automatically controlling the operation of the turn signal lamp.

9. The method according to claim 6, wherein, after the turn signal lamp switch is operated, the method further comprises maintaining the operation of the turn signal lamp until the lane change is detected.

\* \* \* \* \*